United States Patent [19]

Hirvonen et al.

[11] Patent Number: 5,206,640

[45] Date of Patent: Apr. 27, 1993

[54] SURVEILLANCE SYSTEM

[76] Inventors: Esko Hirvonen, Kaurauashi 7, 02340 Espoo; Juhani Niinivaara, 45610 Koria, both of Finland

[21] Appl. No.: 745,714

[22] Filed: Aug. 16, 1991

[30] Foreign Application Priority Data

Feb. 1, 1991 [FI] Finland .................................. 910512

[51] Int. Cl.$^5$ ............................................. H04B 13/02
[52] U.S. Cl. ..................................... 340/852; 324/326; 324/235; 324/72; 324/72.5
[58] Field of Search ................. 340/852; 324/326, 235, 324/238, 72, 72.5, 71.1

[56] References Cited

U.S. PATENT DOCUMENTS

| | | | |
|---|---|---|---|
| 1,209,680 | 12/1916 | Delany | 340/852 |
| 3,214,728 | 10/1965 | Higgins | 340/852 |
| 3,268,854 | 8/1966 | Sato | 340/852 |
| 3,329,929 | 7/1967 | Burnett | 340/852 |
| 3,526,831 | 9/1970 | Smith | 340/852 |
| 3,562,633 | 2/1971 | Swain | 324/1 |
| 3,668,617 | 6/1972 | Brainard, II | 340/4 E |
| 3,946,354 | 3/1976 | Keck | 340/852 |

FOREIGN PATENT DOCUMENTS

| | | |
|---|---|---|
| 82509 | 9/1894 | Fed. Rep. of Germany . |
| 297947 | 8/1915 | Fed. Rep. of Germany . |
| 534562 | 9/1931 | Fed. Rep. of Germany . |
| 2511179 | 9/1976 | Fed. Rep. of Germany . |
| 3634936 | 5/1988 | Fed. Rep. of Germany . |
| 82336 | 10/1990 | Finland . |
| 453619 | 6/1985 | Sweden . |
| 2106653 | 4/1983 | United Kingdom . |
| 2212621 | 7/1989 | United Kingdom . |
| 2217460 | 10/1989 | United Kingdom . |

Primary Examiner—J. Woodrow Eldred
Attorney, Agent, or Firm—Sandler, Greenblum & Bernstein

[57] ABSTRACT

A system for detecting and positioning objects, the electric conductivity of which differs from the surrounding medium thereof by measuring variations in an electric field generated into the medium. More precisely, the invention concerns a method and assembly for detecting objects or objectives, for example vessels, in electrically conductive medium, for example sea, by measuring changes, disturbances, signs, indications or the like caused by the object or objective, especially for surveying water fairways and/or extent. According to the invention, electric current is supplied in the extent to be surveyed via electrodes, magnitude of the current or magnitude of an electric field caused by the current is continuously or uncontinuously measured at selective points by a measuring device for observing when any object or objective to be detected is undetectable in the surveillance extent and when an object or objective to be detected is detectable is in the surveillance extent, and that measurement results originating from an undetectable object or objective and detectable object or objective are compared and differences observed are utilized for detection and/or positioning of the object or objective.

33 Claims, 4 Drawing Sheets

SURVEILLANCE SYSTEM

BACKGROUND OF THE INVENTION

1. Field of the Invention

The invention relates to a system for detecting and positioning objects or objectives, both above and under sea-level, the electric conductivity of which differs from the surrounding medium thereof by measuring variations in an electric field generated into the medium. The examples given in the description below illustrate applications of systems according to the invention mainly for a purpose of surveillance of fairways and bodies of water. More precisely the invention concerns a method and assembly for detecting objects or objectives, for example vessels, in an electrically conductive medium, for example sea, by measuring variations, signs, indications, disturbances or the like caused by the object or objective, especially for surveying water fairways and/or extent, in the following referred to as areas.

2. Description of Related Art

Electric conductivity measurements are previously known and commonly used for geophysical surveys, e.g. in prospecting of ore, oil and gas deposits, mainly to supplement other surveying methods. (See e.g. Geophysics, vol. 49, p. 439).

The use of electromagnetic and sonic waves for detecting ships is known in the prior art. In case of radio waves being used for radar measurements, remarkable problems and drawbacks are involved. For example, by detecting the measuring signals one may easily perceive from an objective that there exists a surveillance monitoring or measurements. However, it is difficult to detect objectives made of non-conducting material. Radars can be located without difficulty, and further the use thereof normally requires the presence of an operator.

Underwater acoustic detecting apparatuses, sounding systems and hydrophones, are known methods for detecting submarines. Therein the propagation of sound in water is made use of. The propagation of sonic waves in water is not linear in all circumstances; the waves can be reflected, e.g., from temperature difference layers, the sound becoming distorted, and the water may contain zones where it is not possible to make acoustic observations. On the other hand, it is difficult to make acoustic detecting observations if the objective vessel lies unmoved at the bottom and in the case of interference noises coming from the area under surveillance. The use of acoustic detecting apparatuses requires sensitive apparatuses and skilled operating personnel.

For detecting submarines also long radio waves can be used and, e.g., infrared light which propagates to a longer distance than an ordinary light wave, especially in muddy water. However, electromagnetic waves normally attenuate rapidly in water and, for this reason, observation ranges remain short. Through a patent document it seems to have become known that electric fields generated by strokes of lightning may be used for detecting submerged objects or objectives at a long distance.

Submarines can also be detected by measuring variations they have caused in magnetic fields or gravitation fields. These measuring methods, however, are often expensive, the computing algorithms complicated and the measurement range limited.

Ore and oil prospecting methods based on modelling and measuring of the resistivity of soil have become known, but their use has remained insignificant as the resistivity of soil changes pursuant to rainfalls and seasons and as the topography of the soil and other, deeper existing layers of earth complicate the making of an accurate and practicable model of the electric conductivity of normal soil and, in addition, it is difficult to measure the potential of a subsurface field. Therefore, the accuracy of the method in measuring the soil is high enough only for detecting sufficiently great anomalies, and more accurate surveys are made by other methods. However, in these geophysical surveying methods mathematical models and computing algorithms have been developed that are practicable in some applications of the method according to the invention.

No publications have been found regarding the use of the resistivity measuring method for surveillance of sea areas, which may be due to the fact that the resistivity of seawater normally is very low and changes in resistivity are difficult to detect and, consequently, there has been no trust in the practicability of the method.

SUMMARY OF THE INVENTION

Surprisingly, the inventors have noticed that surveying methods based on detecting variations in electric field can be carried out with simple devices which very well may be competitive in surveillance of fairways. In the following there is described three variations and versions of the surveillance method according to the present invention as well as several examples of surveillance systems, wherein different versions of the method have been applied for surveillance of sea extents or areas.

The most simple version of the method is based on measuring variations in electric current applied directly to seawater of the surveillance area, by using two electrodes. The version is described in Example 1.

The second version is based on measuring the distribution of electric potential between three electrodes by using as an aid a potentiometer and a bridge circuit. The version is described in Example 2.

The third version is based on measuring bends of equipotential surfaces or variations in the direction of current in the electric field in the surveillance area, for example, by measuring variations in potential between pairs of electrodes placed on the same equipotential surfaces of the electric field.

The third version of the method according to the invention is based upon the idea that electric current is applied to a medium, which in the cases described in the examples is water, between in advance installed electrodes, hereinafter called main electrodes, which electric current when propagating from one electrode to another generates an electric field in a large area. When any object or object having a different electric conductivity in respect to the conductive properties of medium around the same enters this electric field, it immediately causes variations throughout the electric field which are measurable even at a long distance from said object or objective by means of devices and systems according to the invention. By measuring these variations of the field and by analyzing the results, it is possible to observe any entry of the object or objective into the surveillance area and by combining a number of measured observations, the position of the object or objective can be determined by calculating on the basis of the measured observations. A variation in the electric field is detectable as variations in potential, in principle at nearly every point of the surveillance area by means of electrodes, hereinafter called secondary electrodes, or by detectors of electric current. By selecting the measuring points appropriately, the calculations concerned can be made more accurate and the measurements simplified. It is possible to arrange so that there are main electrodes in different directions and electric current can be connected to travel alternately between different pairs of electrodes or at different frequencies in different pairs. In that case it is possible to make several different measurements of the object or objective to be detected and the position of the object or objective can be calculated from the results of the measurements, although not necessarily always accurately and unequivocally.

It is characteristic of the invention, compared to geophysical measuring methods, that when measuring changes caused by an object or objective in the electric field compared to the normal state when there are no objects or objectives, which generally are moving, to be detected in the surveillance area, a model of the electric field is not necessarily needed, although knowing the model may speed up the calculations. In addition, the making of measurements and calculations is simplified by measuring potential differences between appropriately chosen, normally equipotential points. In this case the accuracy of measurements is higher and resolution capability better than when measuring absolute values of the potential at measuring points.

In the functioning of the systems, it is especially difficult to reach sufficient sensitivity of measurement when the object or objective to be detected is small. Measuring is distracted by the surging of the waves, tidal variations and current of masses of water with different salinity in the surveillance area. A major problem in the system is how to arrange the information concerning the type and position of a detected object or objective, for example, at the moment when a moving object or objective crosses a predetermined control line. One more problem is how to present the results in an illustrative form. In the systems described in the examples, these problems have been solved in a manner required by the use of the systems.

In surveillance systems according to the invention, it is preferable to place the electrodes with the surveillance area to be measured approximately symmetrically in respect to each other and the fairway, and to connect the electrodes to measuring devices by means of a switching system and to control the functioning of the switching system by a computer on the basis of observations made so as to make useful observations of the object or objective of surveillance or measurement to improve the accuracy of the measurements. The method does not, however, require placing of electrodes in a strictly determined way if the methods of measuring and computing the results are correspondingly improved to be more efficient.

The resolution of the measuring system according to the invention can be improved by using, for generating an electric field, instead of DC, sinusoidal AC with an appropriately chosen frequency, or pulse-formed current, the use of which may provide certain benefits. The above-mentioned equipotential surfaces are at slightly different points in the medium at different frequencies and an object or objective in the medium causes different variations in electric fields of different frequencies. Thus, by changing the frequency of measurement, different kinds of observations can be made of the object or objective, allowing to determine the kind of the object or objective within certain limits. The use of a pulse-formed electric field makes it possible to have a whole spectra of electric fields of different frequencies in the medium and by means of the pulses a considerably high peak effect can be achieved in cases in which the size of the surveillance area, where measurements are made, calls for it.

A preferable feature improving the accuracy, mainly by reducing the dynamic range of the voltages to be measured and by simplifying the calculating, is to place the secondary electrodes in pairs on the equipotential surface of the normal state, near the place where the object or objective to be detected is supposed to be travelling. For this purpose, pairs of electrodes are installed both on the horizontal plane and, if appropriate, also on the vertical plane, preferably near the middle of the measuring line. Then a voltage difference observed between the secondary electrodes sensitively indicates the direction in which the equipotential surface has bent horizontally and vertically and on the basis of it is possible to deduce on which side of the measuring line the object or objective to be positioned, e.g. a vessel, is to be found. The direction of the electric field may be changed by switching, by means of the switching system, pairs of electrodes in different directions to serve as main electrodes in turns. Through measurement of the bends of the equipotential fields from the secondary electrodes on determined lines, it is possible to find out the pair of electrodes in the vicinity of whic the potential difference is greatest and thus preliminarily position the object or objective. A more accurate positioning can be made thereafter by a computer program by comparing the results to a table containing deviations caused by known objects or objectives by interpolating consecutive observation results with respect to time and place, or by calculating by methods based on the model of the field.

A significant feature of the method according to the invention is that the devices used in the method are simple and inexpensive to make, being approximately as complicated as a radio receiver or radio sender, which allows their abundant use in the surveillance of nearby areas.

There are several new and unexpected purposes which the present measuring method may be applied to. For example, it is possible to compare the measured state of the electric field of a to some extent conductive object or objective studied to the states measured at corresponding points in a similar faultless object or objective. Hereby it is possible to detect anomalies such as deviations between fields measured in different objects or objectives, and compute from them the position of the sources of any errors or anomalies. This comparison method is applicable in cases in which it is not possible to measure any normal state in which no observable error or anomaly exists, of the same object or objective. In applications based on comparison of distribution of an electric field, the measuring allows detection of the aforementioned objects, but also the detection of mistakes, impurities, breaks, or foreign bodies in different materials, collectively referred to as "anomalies", of unintentional impurities or breaks in semiconductor wafers or metal objects or objectives is an example of this aspect of the invention.

The method in accordance with the invention is particularly suitable for automatic surveillance of fairways based on unmanned observation points. The method of measurement can preferably be used to supplement other, traditional measuring methods, e.g., to switch on acoustic or electromagnetic devices, e.g., to warn a vessel or alert monitoring staff. The method is also suitable for surveillance of larger areas because the electrodes and measuring devices are simple and inexpensive.

This kind of surveillance that is based on the use of a nearly static field does not involve the numerous above-mentioned drawbacks of the use of electromagnetic waves. For instance, vessels made of fiberglass or other non-conducting objects or objectives are clearly observable.

BRIEF DESCRIPTION OF THE DRAWINGS

The invention will now be described with reference to the accompanying drawings, in which.

DETAILED DESCRIPTION OF THE PREFERRED EMBODIMENTS

With specific reference to the drawings, particular embodiments of the invention will now be described, beginning with specific Examples 1-7.

EXAMPLE 1

Figure 8:
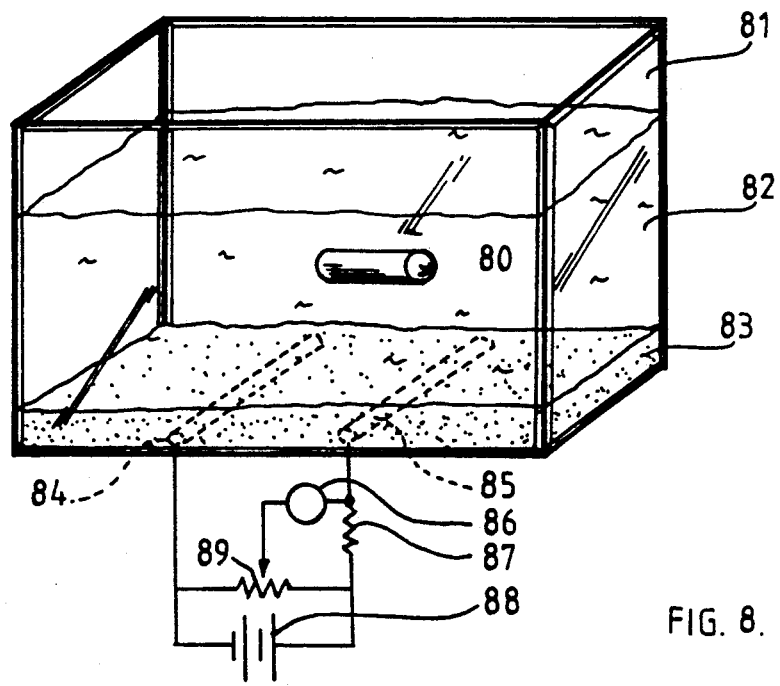
FIG. 8 is a perspective schematic illustration of an embodiment of the invention in which only two electrodes are used.

Embodiment Having Two Electrodes. FIG. 8.

Inventor Juhani Niinivaara has in an unpublished demonstration used the equipment shown in FIG. 8 by means of which it has been possible to prove the workability of the method in accordance with the invention when only two electrodes are used. The equipment comprises seawater, 82, in a water basin, 81, for detecting an object or objective, 80, that has been sunk in the water in the vicinity of copper wire electrodes placed in the bottom of the water basin. Through the wires electric current is applied from a voltage source 88 to the water the strength of which, due to a series resistor, 87, is nearly constant. The sinking of the object or objective in the water causes a minor change in the current in the water space between the electrodes, and corresponding variations in voltage in the resistor 87 and between the electrodes. This change in voltage is measured by means of a broad band oscilloscope, 86, as the change in voltage between the connecting point of the resistor, 87, and the distance between the electrodes, and the balancing potentiometer. The measuring device, 86, is balanced by means of a potentiometer, 89, so as to give a zero reading in normal state. Instead of the potentiometer, 89, the measuring circuit can be set to zero by means of a separate battery, a zener diode circuit or other circuit capable of generating an adjustable voltage.

The bottom of the water basin is covered with sand, 83, and the wires of the electrodes may lie hidden in the sand.

The method can be improved by using as the voltage source in measuring low frequency (e.g. 1-50 Hz) electric current and a narrow band amplifier preceding the oscilloscope. This allows increasing of the sensitivity of the method and elimination of any minor instability caused by coming off of gas bubbles generated in the negative electrode as well as the chemical electromotive force generated between the electrodes and water.

By the method it is easy to detect objects or objectives of good electric conductivity and insulating objects or objectives in the surveillance area between and above the electrode wires. The change in current is proportional to the size of the object or objective, its conductivity and its position compared to the electric field of the immediate surroundings. The electric current is reduced if the object or objective is insulating or if the water level sinks. The method is applicable for detecting vessels in closed sea extend and narrow fairways. It must be possible to compensate variations in water level by adjusting the zeroing between measurements when there are no vessels in the fairway.

An important way of applying the water basin measurement system in practice is its use in scale model tests of real surveillance systems. In these cases a scale model of the fairway to be surveyed is built by shaping sand, and the rocks are built by shaping insulating material. This kind of scale model provides an opportunity to study what the most preferable way of installing the electrodes is to make it possible to achieve adequate sensitivity in detecting certain kinds of objects or objectives in certain kinds of water areas, e.g., narrow channels of real fairways, by means of the surveillance equipment. To allow the electrodes to be moved, the test model can be provided with rails and control rods as well as scales to facilitate positioning. When switching from scale models to the nature, it shall be taken into account that the resistivity values decrease and measuring current grows linearly in the proportion of the scale. The scale model is suitable for studying, in addition to the one explicitly stated in this example, also other systems.

EXAMPLE 2

Figure 1:
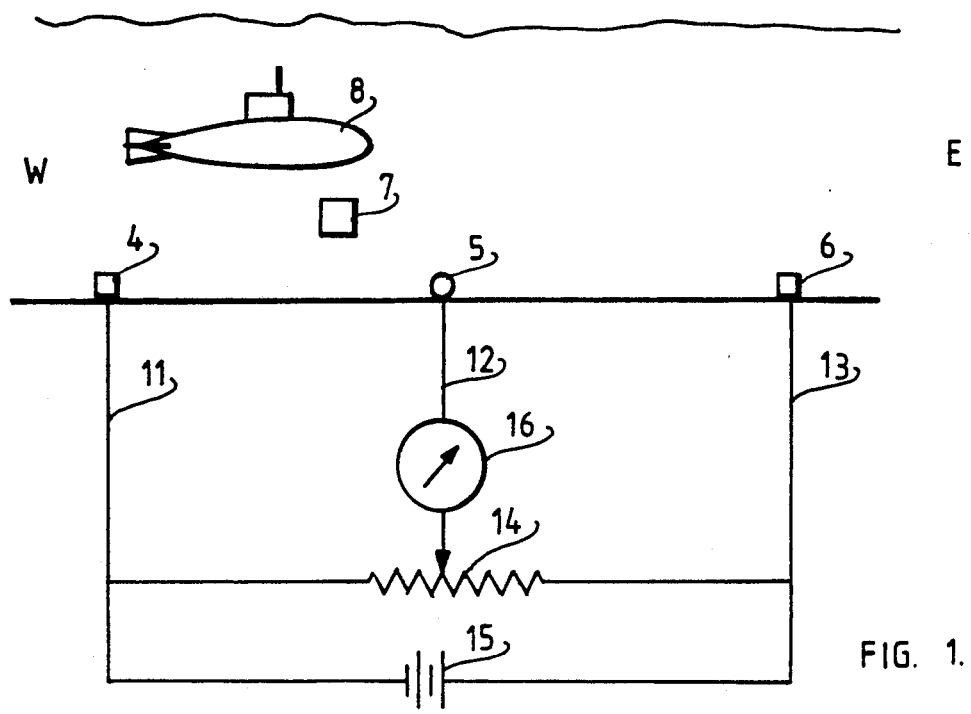
FIG. 1 is a side elevation schematic illustration of an embodiment of the invention for use in a narrow channel.

Simple Equipment for Surveillance of Narrow Channels. FIG. 1.

The problem with the surveillance equipment developed by Juhani Niinivaara and described in Example 1 is the drift of the zero point of the measuring device due to uncontrolled variations occurred in the measuring range or measuring voltage. Although these problems can be reduced by means of automatic balancing and stabilization circuits, the following circuit based on the use of three electrodes offers some additional advantages.

Figure 2:
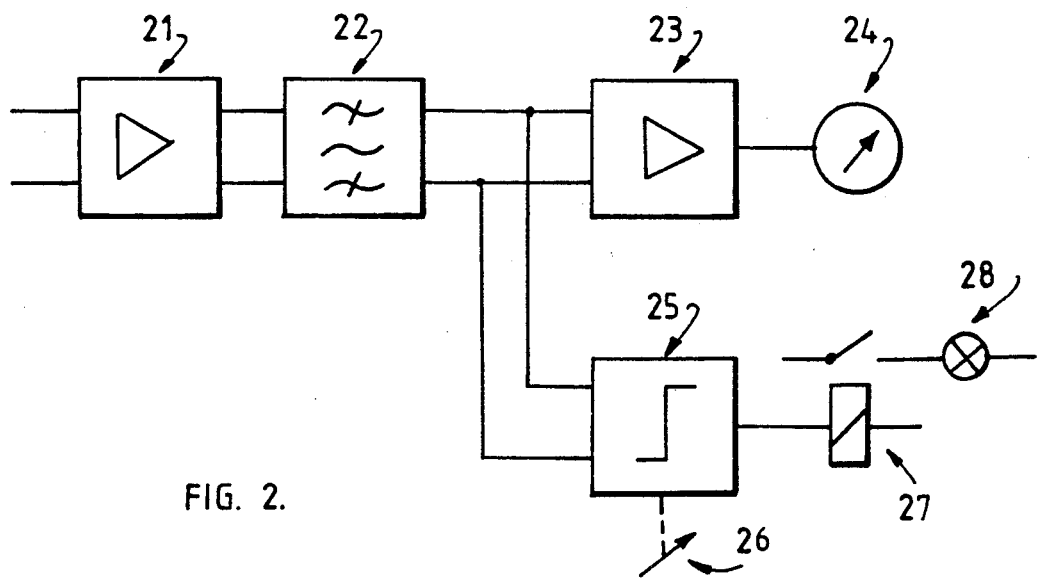
FIG. 2 is a schematic block diagram of an electronic device used in providing a visual indication of the results of measurements obtained in the embodiment of FIG. 1.
Figure 3:
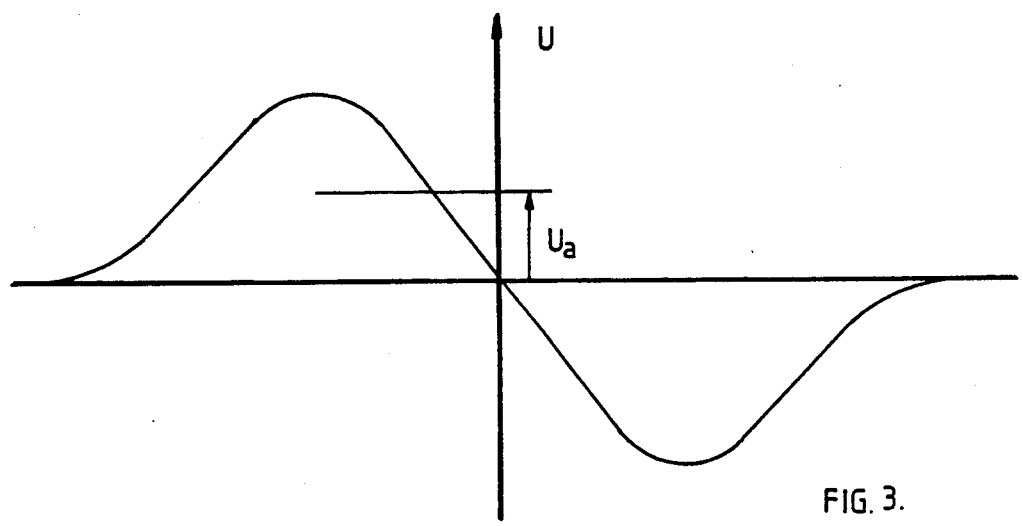
FIG. 3 is a graph which shows a change in voltage caused by a vessel being monitored in the embodiment of FIG. 1.

In this example the functioning of a surveillance system for a narrow channel in a sea fairway is described. FIG. 1 shows a sectional side view of the fairway where 1 illustrates the air above the fairway, 2 water in the fairway and 3 the bottom of the fairway. FIG. 2 presents the block diagram of an electronic device used in visualizing the results of measurements, and FIG. 3 illustrates the change in voltage caused by the vessel in instrument 16 or 24 while the vessel 8 passes along the fairway over electrodes 4, 5, and 6. Electrodes 4, 5, and 6 are wires, ribbons, discs or nets made of material of electric conductivity, e.g. aluminum, and they have been installed at the bottom of the fairway perpendicularly across the fairway. Insulated cables 11, 12, and 13 lead from them to the surveillance device formed by a Wheatstone bridge circuit. By means of the circuit the ratio of potentials between pairs formed by electrodes 4 and 5 on the one hand, and 5 and 6 on the other hand, is measured. The bridge is balanced in the normal state, when there are no vessels in the surveillance area, by potentiometer 14 and the bridge is supplied by a voltage source 15 and the deviation from the balanced state is indicated by instrument 16. In practice, the instrument 16 may preferably be replaced by the equipment presented in FIG. 2, consisting of an amplifier 23, an alarm threshold setting device 25, a control circuit for alarm device 27, and an alarm or indicator lamp 28. An instrument 24 connected to the amplifier may be for example an indicator with digital display which, when necessary, can be connected by means of a cable or a distance-control device to a more remote staffed monitoring room. The whole measuring system can, instead of analog technology, be carried out by means of digital circuits when an appropriate A/D converter is installed to precede the measuring circuit or after the preamplifier.

When a vessel travels along the fairway over the surveying point, the electrodes between the resistivity change in such a manner that the voltage u and the reading of the instrument change as functions of time in the way shown in FIG. 3. The measuring circuit can be connected in such a manner that when the conductivity of the vessel to be measured exceeds that of seawater and the vessel is in the W-marked half of the surveillance area where measurements are made, the reading is positive and in the opposite case negative. An alarm 28 which functions when u exceeds a preset limit value is connected to the measuring amplifier. To be able to position any observation more accurately, an alarm circuit can be constructed which first detects the increase in the voltage and thereafter gives an alarm once the polarity of phase of the voltage has changed 180 degrees. The alarm can be connected to trigger a warning or defense device 7 in the fairway in dangerous situations. To precede the amplifier, first a low-noise preamplifier 21 tolerating excessive voltage may be connected to protect the measuring devices, and a low pass filter 22 to eliminate voltage variations that are too fast to be caused by a vessel. Especially in the digital embodiment, the filter 22 may be replaced by a more complicated signal processor, or similar, which is constructed to recognize the filter out different interferences to avoid any false alarms, in a way known, e.g., from the technique used in hydrophones. Then the amplifier 23 can be adjusted to maximum amplification and the applicable sensitivity of the surveillance equipment grows. When A/C is used in the electric field, the filter may be a pass band filter as shown in FIG. 2.

A variety of equipments described here may be installed in the fairway to be surveyed and they are preferably placed in the narrow parts of the fairway which makes it difficult to round them. The bridge circuit used compensates the errors of measurement caused by variations in water level and the salt content of water, provided that the variations are of the same magnitude in both distances between electrodes. In practice, the size of the vessels can be estimated on the basis of experience, possible with the aid of electronic storage mediums e.g., when comparing deviations caused by observed vessels and those caused by typical vessels and measured in advance. When vessels of known types pass along the fairway, the reading of the meter 24 is taken at different points of the area under surveillance and the readings caused by unknown vessels are compared to these readings.

In the system described above it is not possible to measure directly whether the object or objective searched is well conductive or insulating if it is not known in which half of the surveillance area where measurements are made the object or objective is to be found. In this case the measurement in accordance with Example 1 to determine the size of the object or objective can, by changing the measuring circuit, be made in each interspace between the electrodes. In practice, however, the art or course of the object or objective is in most cases known with high probability, which makes this measurement unnecessary.

EXAMPLE 3

Figure 4:
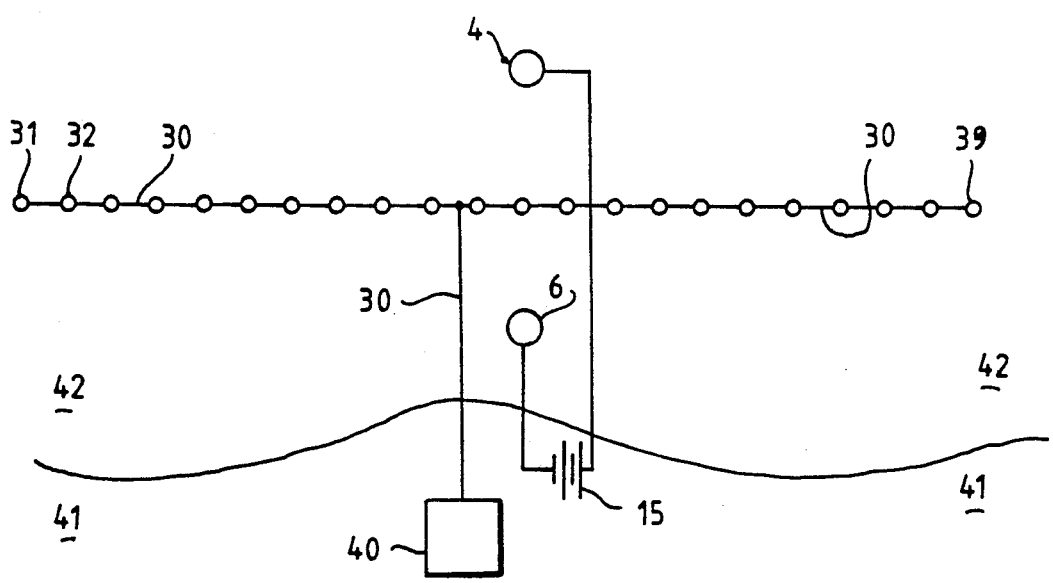
FIG. 4 is a schematic plan view, seen from above, of a coastal surveillance system according to the invention.

Coast Surveillance System. FIG. 4.

The FIG. 4 illustrates a coast surveillance system viewed from above. Along a coast, 41, at the bottom of the sea, at a fixed depth of 50 meters e.g., a well-insulated and shielded multi-pair cable, 30, is placed, having at fixed intervals taps for secondary electrodes, 31, 32, . . . for example, at intervals of one hundred meters. By means of the main electrodes 4 and 6 an electric field is generated at the coast by applying to them electric current from a power source, 15. The voltages coming from the secondary electrodes through the conducting wires of the cables are measured in a measuring center, 40, either simultaneously by a number of measuring instruments, or by connecting, by means of a switching device, the same measuring instrument between different secondary electrodes in turns. When the secondary electrodes are placed on the same equipotential surface, or near it, great amplification can be applied in measurement amplifiers and the sensitivity of the surveillance equipment is high. If the bottom at the coast is smooth and deepens evenly in outward direction, and the connecting line between the main electrodes is at right angles to the coast, the equipotential surface or plane in the water is midway the main electrodes nearly straight and parallel with the cable, 30. When a vessel to be detected crosses the cable, 30, it causes a bend in the equipotential surface and the bending can be observed as a change in voltage difference in the nearest pairs of secondary electrodes. This voltage difference can be switched by means of a device of the kind illustrated in FIG. 2 to cause an alarm in the monitoring room connected to the measurement center.

The cable, 30, may be a mechanically strong multi-pair cable reinforced with nylon or other non-conducting yarns. The mantle need not be waterproof, which facilitates the installing of taps at fixed intervals in the part of the cable that forms the measuring line. The electrodes are preferably metal socks or metal sleeves woven of corrosion resistant yarn, which are fixed around the cable in such a way that they can be pre-rolled in the factory on the same reel together with the rest of the cable. In places where a risk of damage exists, the cable with the electrodes can be installed and covered in a shallow ditch, as a thin layer of sand does not interfere with the electric current. It is an advantage if the location of the cables can be tested and changed in such a manner that the cables can be seen to go along the equipotential surface.

The cable to the main electrodes may consist of one wire of considerable thickness and the electrode at its end of a metal ring with a diameter of a couple of meters. In the part where both of the conductors go side by side, the conducting wires of the cable shall be close to each other or twisted to prevent the stray field from spreading around.

EXAMPLE 4

Figure 6:
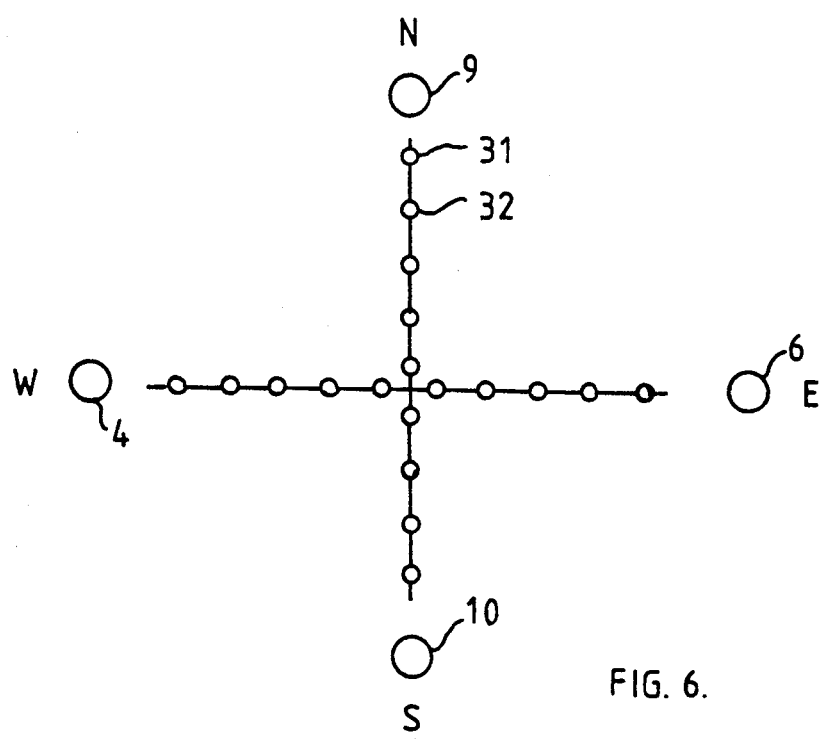
FIG. 6 is a schematic plan view, seen from above, of an embodiment, line that of FIG. 5, in which a plurality of main electrodes and secondary electrodes are used.

Surveillance System for Sea Extent. FIG. 6.

Figure 5:
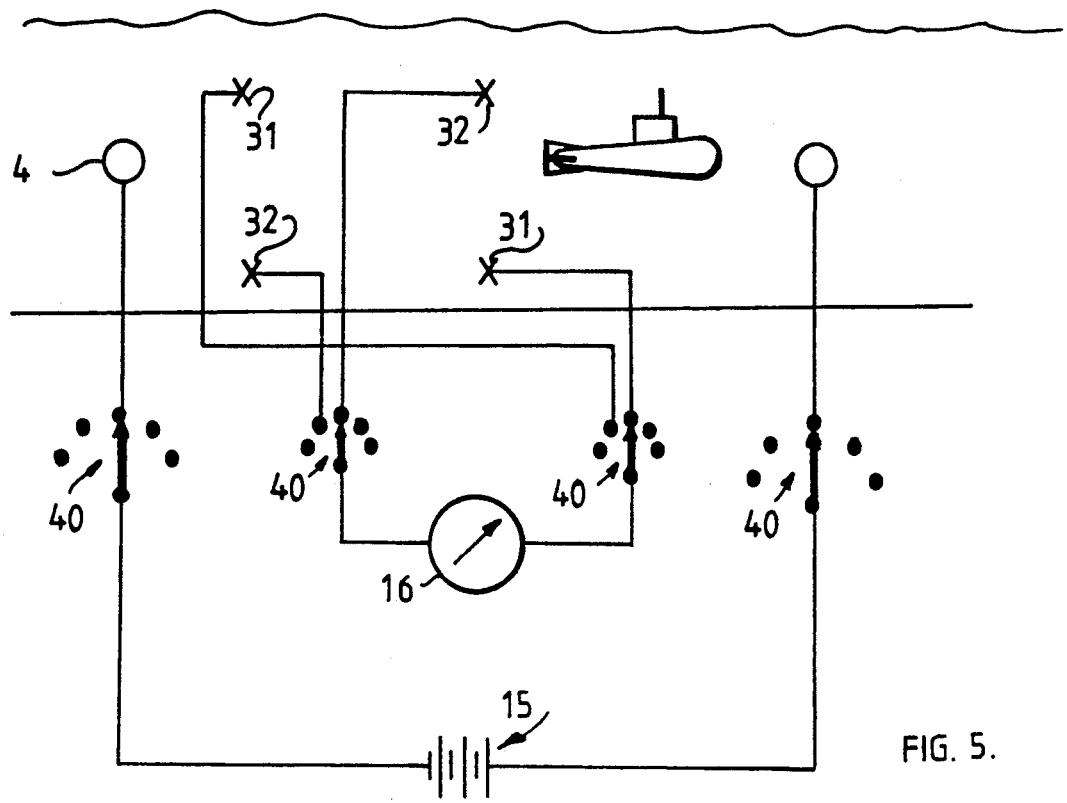
FIG. 5 is a side elevation schematic illustration of a further embodiment of the invention, which includes a plurality of main electrodes and secondary electrodes, in accordance with FIG. 6.

For the surveillance of a large area, a number of pairs of main electrodes, preferably placed at the peripheries of the surveillance area, are used, as well as secondary electrodes in the area to be surveyed. FIG. 6 illustrates, from above, an area having at its peripheries main electrodes 4,6,9, and 10, and having at right angles to each other two measuring lines with secondary electrodes, 31, 32, etc. There may also be a number of parallel measuring lines so as to have the object or objective to be detected always near some of the measuring electrodes pairs. A typical estimation is that a foreign object or objective is detectable if its length is about one tenth of the distance between the electrodes. FIG. 5 shows how the electrodes can be placed in deep places when wishing to find out also the depth in which the object or objective is moving. The figure shows how, by means of switching systems, the various secondary electrodes can in pairs be connected to the measuring instruments and the main electrodes to the current source.

Having a large area with many electrodes under surveillance, a computer can preferably be used for controlling the connecting of the electrodes, making of observations, and handling and visualization of measuring results. The starting point is that the object or objective causes greatest variations in the equipotential surface in its intimate surroundings and thus makes it possible to deduct, on the basis of the changing potential differences in different parts of the surveillance area, where the object or objective is travelling.

When the object or objective, in a water extent with a smooth or symmetrical topography of the bottom, is situated on the connecting line between the secondary electrodes, or on a line parallel to the current of the electric field and crossing the connecting line between the electrodes in the middle, the object or objective does not cause a voltage difference in this pair of electrodes. This is due to the fact that the equipotential surface caused by the object or objective does not bend diagonally, and no difference voltage is generated. If the secondary electrodes have been installed symmetrically on different sides of the connecting line between the main electrodes, these areas with zero reading constitute at the same time the symmetry surfaces of the area. Correspondingly, when the object or objective crosses this kind of "symmetry surface", the potential difference caused by it changes in the way illustrated in FIG. 3 as a function of time. Also, in the case when the conductivity of the object or objective switches from conducting to insulating, the polarity of the voltage difference changes. When the electric field consists of alternating voltage, the turning of 180 degrees of the phase of the difference voltage corresponds to the change of polarity. This turning of polarity in certain lines at right angles to each other can be utilized in positioning the object or objective, e.g., in the following way.

The detection results can be illustrated e.g. by means of lamps placed in a map of the area under surveillance. The voltage indicated by each pair of electrodes can be shown by a red-green pair of lamps. The brightness of the lamp displays the absolute value of the difference voltage and the color of the lamp its polarity. When the object or objective crosses the "symmetry planes" of any pair of electrodes, the color of the pair of lamps at corresponding point changes. Whether these simple proximity observations are adequate for surveillance needs or whether a more accurate positioning of the object or objective is necessary, depends on the use of the surveillance results. Instead of a board with lamps, the results may be transmitted to the screen of a computer monitor.

EXAMPLE 5

Figure 9:
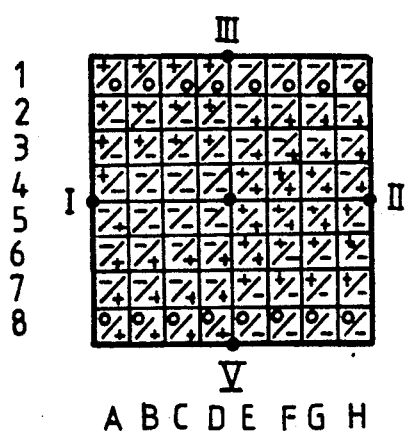
FIG. 9 is a schematic plan view, seen from above, of a still further embodiment of the invention, in which five electrodes are used in a square-formed surveillance area.

Positioning by Means of Table. FIG. 9.

FIG. 9 illustrates from above a square-formed surveillance area with five electrodes I, II, III, IV, and V. Electrodes I and II have in the example been connected to constitute the main electrodes, and the electrodes III and IV on the one hand, and IV and V on the other hand, between them to constitute, in turns, the pairs of secondary electrodes. The surveillance area is divided into squares, like a chess board, and the problem is to draw out a table by means of which it is possible to deduct from the measurement results the square in which the object or objective to be detected could be. In the example, each of the 64 squares indicates with + and − marks the polarities that an insulating object or objective sunk in the square causes first between the measuring electrodes III and IV and secondly between electrodes IV and V. The polarity markings of the first and the second case have been separated by a stroke in the square. In some of the squares the difference voltage is very low, and they are marked with a 0. By changing the places of the main and secondary electrodes, a corresponding table is produced with the surveillance area of the grid turned 90 degrees. This has not, however, been presented in the figure. In this way it is possible to record the directions of the difference voltages produced by four different measurements in each square. The exact boundaries of the squares in this table can be checked by means of a scale model measurement or by moving an object or objective resembling the one to be detected in the actual surveillance area. The table is in advance stored, e.g., in the memory of the computer controlling the surveillance.

When an object or objective enters the surveillance area, which can be observed in the form of a difference voltage generated in one of the pairs of electrodes, the polarity of the difference voltage in the four different circuits described above is measured without delay. By comparing the polarities of the difference voltages in the series of measurements to the table measured in advance, it is possible to deduct logically in which squares the polarities are different and consequently which are the squares where the object or objective cannot be found. This leaves a couple of squares where the object or objective possibly might be found. As the object or objective moves and crosses for example "symmetry planes", new measurements results and through these possible new position squares are received. Among the results, such squares are eliminated through logical deduction as would necessitate skipping squares in between. This will give as a result a square where the object or objective logically thinking could be. The interpretation of the results is accelerated if the assumption can be made in advance that the object or objective is insulating, which is the most common case. When information of the magnitude of the difference voltage is also made use of in the measurement results, for example by preparing a similar table of the ratios of the voltages in different measurements, the deduction making will become faster. Likewise, it will become more accurate if the number of the pairs of measuring electrodes is increased. The example shows that four measurements make it possible to position the object or objective at an accuracy of approximately one quarter of the distance between the electrodes.

EXAMPLE 6

Positioning by Interpolation.

The accuracy of positioning may be increased by measuring the variations in the amplitude of the difference voltage approximately simultaneously between a number of pairs of electrodes while the object or objective is moving, and by comparing the results to a typical diagram (FIG. 3) and by interpolating and estimating the results.

The problem with interpreting the results is that the magnitude of the difference voltage generated by a foreign object or objective depends both on the change in the electric field caused by the size and conductivity of the object or objective and on the distance of the object or objective from the "symmetry planes" between the electrodes and the electric field, typically as a function of distance in accordance with FIG. 3. In addition, the direction of an asymmetric object or objective compared to the direction of the electric field considerably affects the magnitude of the difference voltage. When an object or objective moves approximately linearly across the "symmetry line", its position may be estimated in the following way. Two pairs of electrodes, a1-a2 and b1-b2, are used in the measurement on the same equipotential surface in such a way that the locations of the electrodes in pair b1 ... b2 are at a distance d from electrodes a1 and a2. d can be, e.g., shorter or equal to the equal distances between electrodes a1 and a2, respectively b1 and b2. When the object or objective passes the electrodes approximately parallel with the connecting line between the electrodes, a change in voltage as a function of time like the one presented in FIG. 3 can be measured from both pairs of electrodes, but the zero point is at different location in the voltage curves of different pairs of electrodes. The time difference between the zero points of the curves corresponds to the time taken by the projection of the object or objective to travel the distance d parallel to the connecting line. On the basis of this information it is possible to estimate the position of the projection of the object or objective at different points of the series of measurements. Correspondingly, it is possible to measure the position of the object or objective in another direction at right angles to this plane when there are two measuring lines in the surveillance area at right angles to each other, e.g., in the way presented in FIG. 6.

The form of the voltage change in accordance with FIG. 3 can be estimated (manually or by computer) approximately on the basis of a couple of observations and the position calculated on the basis of the estimated measurement curve. In this case it is not yet necessary for the object or objective to cross the symmetry planes to allow the calculation of its position from the results. If the direction or velocity of the object or objective changes during the measurements, it will cause an error in the estimate of the location in this example. However, it is possible to see the stopping of the object or objective in the results of the measurements and then another method must be used for calculating the position.

If the object or objective is in the surveillance area but does not move, it is possible to position the object or objective by comparing a high number of measuring results obtained from pairs of electrodes on the same line, if the object or objective is big enough to allow an observation from a number of different pairs of electrodes. A curve similar to the one presented in FIG. 3 can be formed of them having as a horizontal axis, instead of time, the position of the middle point of the pair of electrodes on the measuring line. Naturally, a combination of measurements according to the examples may be used in positioning. The reliability of the results can be improved by rejecting unreliable values caused by interferences, if any, among a number of measurements, and also if mean values, or corrected measuring values obtained by the least squares method, can be calculated from a series of a number of measured observations.

The transferring to a computer and handling of the measuring results has become known through a number of similar computer controlled measuring methods.

EXAMPLE 7

Three-Dimensional Positioning.

In a positioning method applicable for a deep sea, a three-dimensional model of the electric field in the surveillance area concerned is utilized. A foreign object or objective entering the surveillance area causes variations, disturbances, in the electric field. When a sufficient number of measured observations has been gathered, i.e., after adequate empirical data have been gathered, it is possible, by testing and iterating, to calculate from the model in which part of the surveillance area the source of the disturbance is to be found.

The resistivity of the water between the electrodes is a threefold integral of the conductivity of the medium in the said part of the space. In the three-dimensional, in itself known, model formed by small finite elements and fit for calculations by computer, the water level as well as the topography of the bottom and conductivity of the water shall be observed as boundary conditions. The model, e.g., the method described in the Geophysics reference mentioned in the beginning of this specification, may be used to visualize the topography of the bottom of the surveillance area. Terrain measurements required by the model may be troublesome and thus the described scale model method can be applied as an aid. In practice, a sufficient accuracy of measurement may be achieved by applying a simple model, e.g., by using the average depth of the water in the measured area as the figure describing the depth of the water. The theoretical model can be improved or possibly the whole model can be drawn up by inversion method by computing on the basis of sufficiently frequent measuring results received from the surveillance area when it is empty.

In the computer handling based on the model of the measuring results the whole measurable area is, e.g., divided in a known manner into elements smaller than the desired accuracy of measurement, and a table is compiled of these elements, a matrix, which is handled by computer by methods used in matrix calculation method. The electric field is distributed according to a known theoretical model in the whole measuring area and allows the potential of each element and the current density in it to be calculated in the table in advance. From the model it is also possible to calculate the resistances between the electrodes. These calculation methods are in themselves known from scientific articles on geological soil surveys and for said matrix calculation method software is available for typical and simple boundary values.

When computing the position of the source of interference in the field on the matrix visualizing the surveillance area discussed, a so called inversion is carried out and, through experimentations, the position and magnitude of an object or objective in the surveillance area is searched having an effect on the electric field that best matches with the measured values received in different measuring situations. As the method is based on experiments and iteration and the matrix handled may contain millions of elements, the computing capacity required is fairly large, especially if the results should be received in real time. There is a variety of feasible computing methods, some of which may be suitable for the application desired and fall within the capacity of the computer at disposal. The methods differ from each other mainly as regards the computing algorithms and these algorithms are not patentable in themselves. The period of time required by the computing is substantially reduced if the position and kind of the objects or objectives to be positioned are first known in the form of approximate values. For this reason a preferable way of computing may be a combination of the measuring method according to the examples described above and the model-based computing method. First the approximation method described in the previous paragraph can be used and thereafter the more accurate matrix calculation method.

Some special methods, e.g. the use of neural computers, seem to be useful in solving the problem concerned. Among these, the method of self-organizing maps developed by Professor Teuvo Kohonen, seems to be promising. It is an adaptive computing method by means of which, starting from an approximate value, it is possible to find the N-dimensional result that best meets the boundary conditions given. Another possible method is the back propagation method (BPM). Methods presented here are already used in models based on magnetic fields and measurements of electromagnetic fields.

In computing, it is preferable to use renewed measurements based on intermediate results. In principle, the accuracy of computing grows as the number of measurements grows. In model computing, however, the computing times in the computer are so long that if it is possible to deduce in which stretches between electrodes additional measurements are required, it is worth while to utilize the intermediate results for making of new measurements with the electrodes connected in the most favorable ways and to avoid the use of such measuring results as cannot increase the accuracy.

In deep water electrodes shall in any case be placed at different depths above the bottom to have the object or objective positioned three-dimensional. Above the bottom but below the surface electrodes stay in their places when they are equipped with buoys and anchored, e.g., at the edges of the fairways in the bottom with diagonal ropes in three directions. The electrodes must not move during measurements, otherwise measuring results will contain errors.

Visualization of the Result

When the water in the surveillance area is not very deep and the distance between the electrodes exceeds the depth, the most important thing relating to the display of the surveillance equipment is the representation of the coordinates of the object or objective detected in one plane, like the map. There is a variety of different methods of visualizing the depth where the object or objective is in the display unit. In equipments intended for commercial use, the display unit of radar equipments may be used, even by combining in the same representation the radar image obtained from the surface of the area under surveillance and the measuring result obtained by means of electric field measurements from below the surface. For example, the position of an object or objective at different depth planes can be presented by different colors, and the size of the object or objective by the size or brightness of the spot or in some other illustrative way. In this case the measuring result regarding the position, size and kind of the object or objective obtained by means of the electric field is first converted, by means of a suitable converter, to the form required by the display unit. The representation of the depth value in a single-color display unit can be realized, e.g., by means of a digit written out adjacent to the object or objective. This mode of representation suits well for visualization of results obtained by means of matrix calculating method.

In sophisticated surveillance systems where the above-mentioned matrix calculation method is applied, a preferable way of visualizing the results is to present three-dimensional objects or objectives as tomogram where one partial plane of the image illustrates a horizontal sectional view of the surveillance area at a certain depth, or, as is preferable in narrow fairways, the partial image illustrates a vertical sectional view, a slice, of a point of the area under surveillance. These modes of representation and their realization in computer systems have become known through the so-called tomogram imaging where, e.g., X-ray photographs of different parts of the human body are presented slice by slice.

Frequency of the Electric Field and Measuring Circuits

The measuring current of the electric field may consist of DC, AC, or periodic or single pulses. DC generates gas bubbles and electrochemical electromotive forces on the surface of the electrodes causing instability in the measuring results. On the other hand, DC allows the use of a simple low pass filter and the determination of polarity is easy. Typically very low frequency AC is used in geophysical measurements. To determine the polarity of the voltage difference when AC is used, the phase difference between an observed difference signal and the current between the main electrodes shall be measured, for which purpose well-known phase comparison methods and standard components are at disposal.

When the frequency of the AC is increased, the propagating characteristics in the medium of the electric field, the effects of the boundaries of the surveillance area and those of different kinds of objects or objectives on the field are changed. The sensitivity decreases at long measuring distances. In identification of the detected object, or objective the fact may be utilized that the object or objective changes the field in different ways at different frequencies and with different directions of the field.

The use of AC provides an opportunity for simultaneous function of different measuring circuits in the same surveillance area. Current sources and filters of amplifiers in different measuring circuits are tuned at different frequencies. The band width of the amplifier shall be narrow to ensure sufficient selectivity and to reduce the noise, but the measurement velocity needed requires a fixed minimum band width.

A periodic pulse-formed electric field contains different components simultaneously. The difference signal caused by a foreign object or objective can be studied, e.g., with an oscilloscope in which the effect of the characteristics of the object or objective detected on the form of the pulse is visualized. In a certain situation, for example, a long conductive object or objective in the direction of the electric field causes a bigger sharp peak in the front edge of the pulse, and a broad insulating object or objective transversely in the electric field the greatest difference signal at low frequencies. If this changed form of the pulse is called the "fingerprint" of the object or objective, it is often possible to identify also the kind of an unknown object or objective with the aid of the "fingerprints" of a great variety of known objects or objectives. The use of this method requires that the difference signal in the normal state can be compensated by a so called "echo cancelling circuit" so that the effect of a different "terrain" on the fingerprint can be eliminated so effectively that in the normal state the display of the oscilloscope is a straight line, which only shows noise and the uncompensated effect of the surging of the waves. The need for compensation is created, e.g., through the fact that the equipotential surfaces are in different places with different frequency components and thus the difference signal of the normal state is dependent on the frequency and the surroundings of the measuring place, i.e., the combination of electrodes used. This measurement of the "fingerprint" needed in identification can be combined as an optional component to other measurements in sophisticated surveillance equipments.

The use of a pulse-formed electric field easily allows the transmitting of information, e.g., certain codes, in the electric field, through application of a variety of different, from pulse technique known, modes of modulation and coding. The codes can be used for identification of different systems and for transmitting of information to vessels in the surveillance area as well as to the controlling of automatic measuring instruments.

Separate or infrequently repeated pulses are preferably used in generating an electric field when maximum possible sensitivity, the capability to detect small objects or objectives, is desired in a large surveillance area. In this case the electrical power required is high and generating it in the form of continuous pulses would require remarkably heavy high-power current sources. In this case it is preferable to concentrate the power into separate pulses and make the measurements during one pulse. A way of generating a pulse is to charge a big condenser with direct current to high voltage and to discharge this voltage by means of an appropriate switch and through an appropriate reactance into the wires to the electrodes by applying in itself known pulse technique. An advantageous embodiment of pulse-formed current supply is to place the condenser and the switching components adjacent to the main electrode, to avoid making the current supply cables unreasonably thick. However, one thick wire is needed between the main electrodes.

The setting of the electrode pairs at exactly the same equipotential surface is in practice difficult. In this case the difference voltage between the electrode pair is not zero in the normal state and the direction of the change caused by a foreign object or objective cannot be observed directly of the polarity or phase of the signal, as described in Example 5, but the direction of the change of the different voltage is calculated from the difference of the difference voltage in the normal state and that of the changed state taking into account the polarities or phases of the observations. For visualization of this difference voltage by means of analog display, e.g., through brightness and color of the signal light, it is preferable to provide the measuring circuit with a compensating circuit, by means of which the display is zeroed in the normal state by supplying in the measuring circuit a difference voltage of opposite phase from a separate adjustable voltage source. In digital form this calculation does not create a significant problem when one frequency at a time is used in measuring.

When using AC in the compensating circuit, also the phase difference must be compensated. Realizing the compensation simultaneously at more than one frequency results in a complicated structure of the compensating circuit. In the planning and calculating of these circuits, the same principles may be applied as are applied in the echo cancelling devices of data transmission modems adapted to the frequencies applied. The principle known in this technique is that from the circuit of the main electrodes, part of the signal is lead through shaping circuits and is summed in the difference signal to be measured. In a conventional embodiment of the shaping circuit the signal is, with the adjusters, "taps", included in the embodiment, adjusted to equal exactly the signal emitted by the normal state and to have the opposite phase, whereby its effect is compensated in the summing process. The setting of the taps can be carried out automatically in the normal state, particularly when controlled pulses are used in the electric field. An embodiment of this technique is disclosed in the patent specification FI 82336. Especially in digital devices the echo cancelling can be realized by means of complicated, but inexpensive circuits, preferably signal processors.

Further Embodiments

In principle, current in a medium can also be measured by means of the magnetic field it generates. The direction of the current can be measured with accuracy by a magnetic field sensor. Instead of the above-mentioned pairs of secondary electrodes, variations in the direction of the electric field caused by a foreign object or objective can be measured by magnetic field measuring sensors. The advantage of this measuring method lies in the fact that the detector is not in galvanic coupling to water, which reduces the risk of disturbances.

The direction of the magnetic field can be measured in a known manner, e.g., by means of three coils placed in planes at right angles to each other. A sensor of this type can be completely insulated against seawater and thus it is not sensitive to corrosion. A weak electric current can be focused to the point of the detector by means of an insulating disc surface surrounding it, as presented in patent application GB2212621.

Of particular interest is the possibility of using the presented measuring method as a moving or temporary measuring system let down from vessels or helicopters, when the surveillance area is not included in any stationary surveillance system.

Following possibilities exist in this respect. In the first of them, a buoy with an electric current source and switching devices can be let down by a helicopter in the surveillance area. Thereafter, cables with one end fixed to the buoy and the other end provided with electrodes that can be connected to serve either as the main electrodes or as a pair of secondary electrodes, are let down from the helicopter over the surveillance area in different directions from the buoy, and the cables are sunk in the bottom. Between the electrodes, electric current is switched from the buoy, e.g., through radio control, which current generates an electric field covering the whole surveillance area. The values measured from the field by the measuring instruments placed in the buoy are transmitted by radio to the vessel or helicopter in charge of the operation equipped with a computer for controlling and handling the measurements. The measuring method requires that the electrode spacings remain exactly the same. Variations in the electric field are then caused by other objects or objectives moving in it.

Measuring results from a deep sea or from an area with a known bottom topography may be compared to measuring results obtained from the model and then it is possible to detect also motionless objects or objectives in the area. Instead of buoys, it is possible to use vessels where the measuring equipment has been installed.

When using patrol vessels in searches in a deep sea a method can be tested where the three electrodes described in Example 2 are installed in the bow, middle and stern of the patrol vessel. Then it is possible to detect objects or objectives in the immediate proximity of the vessel when passing over them. In shallow water, it is possible to detect the asymmetries of the bottom with respect to the middle electrode.

Figure 7:
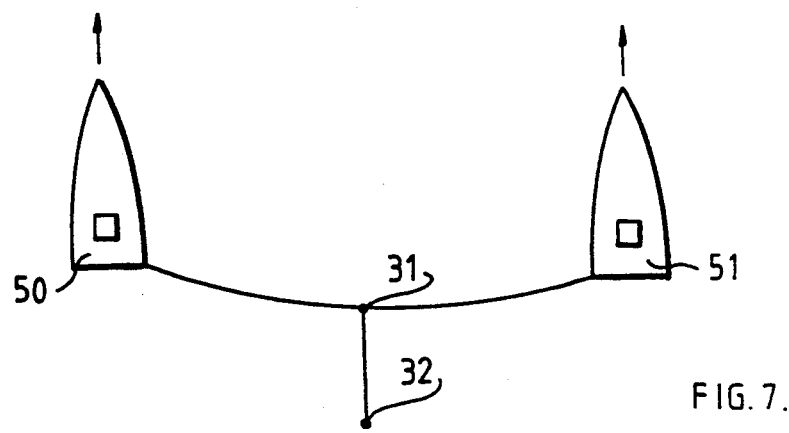
FIG. 7 is a schematic illustration of a further embodiment of the invention.

A feasible method of mobile search is to employ two vessels 50, 51, as shown in FIG. 7, moving; parallel, at a fixed distance from each other, having an insulated cable between them and in the middle of the cable the middle electrode of Example 2 or the pair of electrodes of Example 3. If the bottom of the vessels is electrically conductive, the vessels themselves may serve as main electrodes. If the secondary electrodes remain exactly in the middle of the cable, the distance between the vessels need not be kept exactly the same. By this method it is possible to detect objects or objectives in the area between the vessels.

When an electric field has been supplied into the surveillance area by the main electrodes, vessels moving in the surveillance area may be equipped with in the bow and the stern placed voltage difference measuring electrodes which allow the measurement of the direction of the equipotential surface of the electric field at the point where the vessel is, e.g., by turning the vessel so that the voltage difference is zero. If the direction of the vessel can be kept stable, or the effect of the turning compensated, a change in the voltage difference indicates than an object or objective is moving in the field near the place of measurement.

An interesting way of having an electric field generated is to make use of the electric fields generated in connection with DC power transmission across certain narrow sea fairways. Plans of this type exist, e.g., for the sea area between Sweden and Finland. In that case it would be possible, by means of this electric current crossing the whole Gulf of Bothnia, to measure the traffic across the Gulf by placing measuring cables at appropriate points in the bottom of the surveillance area.

The electric field in the fairway can also be used as a navigation system. In the bottom of own vessels electrode pairs can be installed in both longitudinal and cross direction and on the basis of the difference voltage obtained from these the vessel may be steered parallel to the electric field or in a direction at right angles to it, and by combining the information obtained from these, at a desired angle with respect to the electric field. By combining the information about direction given by a number of different pairs of main electrodes, the vessel can be navigated in a large water area. Asymmetric topography of the bottom and other vessels entering the fairway, however, cause bends in the shape of the electric field. This may be an advantage in certain situations, as electric current tends to round rocks and capes and, by following the direction of the electric current, it is easier to find deep fairways than by following direct lines. The advantage of this navigation method, or fairway sailing method, is that it is totally invisible and its existence can be kept secret.

Possible Counter-Measures

One counter-measures against being detected is to paint the hull of the vessel with a paint having the surface resistance dimensioned so that it totally equals the resistivity of a water column of the vessel's length. The disturbance caused in the electric field cannot be fully compensated this way, as the most advantageous surface resistance depends on the size of the object or objective and the resistance should be higher in the transverse than the longitudinal direction and different when the object or objective is on the surface than when it is wholly under water, and in addition it depends on the salt content of the seawater within the operating range.

To minimize the "fingerprint" of a submarine, its conductivity in the "worst" direction of the electric field should be as close to the conductivity of the seawater both at the lower and the higher end of the measuring frequency employed. At the lower end, the conductivity can be trimmed by the surface resistivity of the paint. At the higher end the conductivity can be trimmed by painting beneath the surface paint first an insulating layer with an appropriately dimensioned dielectric constant. Beneath this surface the metallic surface of the vessel shall have a good conductivity.

Wide-range electrodes may be installed on the sides and ends of the vessels and detect and measure the voltage generated by extraneous measuring current between the electrodes. After that it is possible to mathematically calculate in the vessel what kind of resistor should be installed between the electrodes to disturb the electric field to the smallest extent possible. A device indicating to the surveillance equipment that an object or objective being measured is an own vessel can also be connected to the electrodes. This can be realized for example so that between the electrodes in the bow and the stern of the vessel a resistor is connected that periodically differs from the characteristics of the vessel, e.g., a short circuit at the pace determined by an agreed code. This is a difficult method, but evidently reasonable in price compared to the EMC interference equipment of warships.

The measuring field can be disturbed by letting metal conductors, salt solution, or fresh water, which cause ghost results, in the surveillance area. In surveillance systems according to the invention utilized for military purposes, the above means of disturbance may be revealed by measuring and calculation methods, and the surveillance continued, though the surveillance will become more difficult. In any case, because different surveillance methods complement each other, a new and surprising surveillance method will essentially diminish the possibilities to avoid the surveillance.

The invention has been described above only by few advantageous embodiments. Naturally this is not meant to limit the invention and as it is evident to any skilled in the art several modification, variations etc. are possible within the scope of the invention defined in the accompanying claims.

What is claimed is:

1. A method of detecting an anomaly, the anomaly being located in an electrically conductive medium, the method comprising the steps of:
    arranging a plurality of current feeding electrodes and detecting devices in a predetermined manner, said predetermined manner including at least a pair of said detecting devices arranged generally in an equipotential surface;
    generating at least two electric fields by means of at least two pairs of said current feeding electrodes, said at least two electric fields having different orientations;
    measuring an electric field parameter between a said pair of said current feeding electrodes; and
    comparing said measured electric field parameter to an electric field reference parameter, said electric field reference parameter representing absence of the anomaly.

2. A method of detecting according to claim 1, further comprising the step of generating an indication signal in response to the detection of an anomaly as a result of said step of comparing.

3. A method according to claim 1, wherein:
    the anomaly is a vessel, said electrically conductive medium is water, and said area to be surveyed is a water fairway.

4. A method according to claim 1, wherein:
    the anomaly is a vessel and the method of detecting comprises a method of navigating the vessel through a water fairway, wherein said method further comprises the step of steering the vessel in response to said step of comparing.

5. A method according to claim 1, wherein:
    the electrically conductive medium comprises a member selected from the group consisting of: a semi-conductor wafer and a metal object, and the anomaly comprises a member selected from the group consisting of: an impurity and a break.

6. A method according to claim 1, wherein:
    said step of generating an electric field comprises generating an electric field by means of direct current.

7. A method according to claim 1, wherein:
    said step of generating an electric field comprises generating an electric field by means of alternating current having a predetermined frequency.

8. A method according to claim 1, wherein:
    said step of generating an electric field comprises generating an electric field by means of pulsed current of a predetermined form.

9. A method according to claim 1, wherein:
    said step of measuring an electric field parameter comprises measuring a parameter of an electric potential difference between said pair of said current feeding electrodes, wherein said step of comparing said electric field parameter to an electric field reference parameter comprises comparing a parameter of a measured electrical potential difference to a parameter of a reference electric field difference.

10. A method according to claim 9, wherein:
    said parameter of an electric potential difference comprises the amplitude and phase of the electric field of the electric potential difference, wherein said step of measuring a parameter of an electric potential difference comprises measuring electrical amplitude and phase, and wherein said step of comparing a parameter of a measured electrical potential difference to a parameter of a reference electric field difference comprises comparing a measured electrical phase to a reference electrical phase measured from the feeding current.

11. A method according to claim 1, wherein:
    said step of measuring an electric field parameter comprises measuring a change of magnitude and direction of a magnetic field caused by the anomaly.

12. An apparatus for detecting an anomaly located in an electrically conductive medium, said apparatus comprising:
    (a) means for supplying an electric field in said electrically conductive medium, said means comprising at least two pairs of current feeding electrodes located in such positions, that the electric fields generated have different orientations;
    (b) a plurality of detection devices, said devices connected in pairs and placed in an area of said electrically conductive medium to be surveyed;
    (c) an electronic assembly for providing an indication of a state of detection of the anomaly, the input of said assembly connected to said pairs of detection devices, said electronic assembly comprising an amplifier, a filter tuned at least to one of the frequencies used in the feeding current, and a display unit, said electronic assembly comprising:
        (i) means for measuring an electric field parameter between said pair of detection devices;
        (ii) means for comparing said electric field parameter to an electric field reference parameter, said electric field reference parameter representing absence of the anomaly; and
        (iii) a display system for displaying results obtained by said means for comparing; and
    (d) a switching system for connecting said current feeding electrodes to respective current sources and for connecting said detecting devices to respective electronic assemblies.

13. An apparatus according to claim 12, further comprising:
an analog/digital converter, a phase detector, and a signal processor, wherein said electric field reference parameter comprises a potential difference reference parameter representing the absence of the anomaly, whereby said signal processor comprises means for forming a compensating signal for compensating the display signal for deviations in said potential difference reference parameter from a predetermined value.

14. An apparatus according to claim 12, further comprising:
a map of said area of said electrically conductive medium to be surveyed;
an electrical circuit including lights for representing positions of the anomaly within said area, each of said lights having means for displaying a plurality of colors in range of brightness;
a comparison and decision making system comprising tables representing empirically gathered data relating to measured electric field values at different locations within said area; and
decision tables for cancelling impossible results from positions represented by said electrical circuit.

15. An apparatus according to claim 12, further comprising:
a computer having a memory, said computer memory having stored therein a three-dimensional model of said area of said electrically conductive medium to be surveyed, said stored three-dimensional model being composed of a plurality of elements smaller than a desired accuracy of measurement, said computer memory further having stored therein a representation of said electric field in said area and a representation of resistances between said detection devices by assigning a potential to each of said plurality of elements and, further, from experimentation with said computer model, a representation of an electric field parameter for respective different locations of the anomaly in said area, to thereby enable the calculation of the precise position of a detected anomaly.

16. An apparatus according to claim 12, wherein:
said means for connecting said electronic assembly to said plurality of detection devices comprises a corrosion-resistant cable having an outer shield and a plurality of individually insulated conductors, said cable further comprising outlets at fixed distances for connection to electrodes, said cable with electrodes connected thereto being adapted to be coiled upon a reel.

17. An apparatus according to claim 12, said anomaly comprising an object located in said electrically conductive medium, said apparatus comprising means for moving said object and further comprising:
sensors installed on said object, said sensors comprising means for measuring the direction of said electric field for the purpose of steering the object as a function of the results obtained by said means for comparing.

18. An apparatus according to claim 17, wherein:
said object comprises a vessel and said electrically conductive medium comprises sea water, said apparatus further comprising:
a countermeasure against being detected comprising means on the vessel for periodically changing conductivity of the vessel, and means for transmitting conductivity changes to a further vessel.

19. An apparatus for detecting an anomaly in an electrically conductive medium, apparatus comprising:
a plurality of current feeding electrodes, selectively positionable and re-positionable within an area of said electrically conductive medium to be surveyed, arranged in a predetermined manner, said predetermined manner including at least a pair of said plurality of current feeding electrodes being generally arranged in an equipotential surface;
means for feeding electric current having a predetermined variable form to selected ones of said current feeding electrodes for generating at least two electric fields to said area to be surveyed, said at least two electric fields having different orientations;
means for measuring an electric field parameter between said pair of said plurality of electrodes;
means for comparing said electric field parameter to an electric field reference parameter, said electric field reference parameter representing absence of the anomaly; and
means for displaying results of said step of comparing.

20. An apparatus according to claim 19, wherein:
said apparatus further comprises a scale model of a full scale apparatus for enabling the study of the full scale apparatus and methods of use of said full scale apparatus, said scale model apparatus comprising:
a water basin having an interior bottom surface;
a quantity of material in said water basis for simulating a full scale known water fairway, said plurality of electrodes being arranged in said predetermined manner in or on said quantity of material; and
a model of an anomaly to be detected.

21. An apparatus according to claim 20, wherein: said model of an anomaly comprises a model of a vessel.

22. A method according to claim 1, wherein:
said detecting means generally arranged in an equipotential surface are composed of detecting electrodes.

23. A method according to claim 9, wherein:
said parameter of an electric potential difference comprises the amplitude of an electric potential difference at pulse form when the electric field generated is of pulse form, said method further comprising the step of displaying a parameter of an electric potential difference, said step of displaying further comprising displaying distorted pulse form, representing the electrical properties of the anomaly and wherein said step of comparing a parameter of a measured electrical potential difference to a parameter of a reference electric field difference comprises comparing a measured electrical potential to a reference electrical potential.

24. A method according to claim 1, wherein:
said step of generating an electric field comprises generating an electric field including coded information for a vessel.

25. A method according to claim 24, further comprising the step of:
monitoring the area to be surveyed with infrared imaging apparatus for verifying results obtained in said step of comparing, said monitoring activated by said coded information.

26. An apparatus according to claim 12, wherein:

at least one pair of said current feeding electrodes are provided with a dual function operation controlled by said switching system such that said current feeding electrodes operate alternately as current feeding electrodes and detecting devices.

27. An apparatus according to claim 12, wherein:
said detecting means arranged generally in said equipotential surface are detecting electrodes.

28. An apparatus according to claim 12, further comprising:
means for transmitting coded information to a vessel by modulating said means for generating an electric field with said coded information.

29. An apparatus according to claim 12, comprising:
means for connecting said electronic assembly to said plurality of detection devices comprises a corrosion-resistant cable having an outer shield and a plurality of individually insulated conductors, said cable further comprising outlets at fixed distances for connection of electrodes, said cable with electrodes connected thereto being adapted to be coiled upon a reel; and
a computer, said computer comprising:
  a memory, said memory having stored therein a three-dimensional model of said area of said electrically conductive medium to be surveyed, said stored three dimensional model being composed of a plurality of elements smaller than a desired accuracy of measurement, said computer memory further having stored therein a representation of said electric field in said area and a representation of resistances between said devices by assigning a potential to each of said plurality of elements and, further, experimentation with said computer model, a representation of an electric field parameter for respective different locations of the anomaly in said area, to enable the calculation of precise position of a detected anomaly; and
  a system for at least two of functions in the group: storing said results of said steps of comparing, processing said results, controlling said switching system, controlling said display system, controlling said coded information, storing the three dimensional model of the area to be surveyed.

30. An apparatus for detecting an anomaly in an electrically conductive medium, said anomaly comprising an object located in said electrically conductive medium, said apparatus comprising:
a plurality of electrodes, selectively positionable and re-positionable within an area of said electrically conductive medium to be surveyed, arranged in a predetermined manner, said predetermined manner including at least pair of said plurality of electrodes being generally arranged in an equipotential surface;
means for feeding electric current having a predetermined variable form to selected pairs of current feeding electrodes for generating at least two electric fields to the area to be surveyed, said at least two electric fields having different orientations;
means for moving said object, and further comprising:
sensors installed on said object, said sensors comprising means for measuring the direction of said electric field for the purpose of steering the object as a function of the results obtained by said means for comparing,
means for transmitting coded information to a vessel by modulating said means for generating an electric field with said coded information, and
means for receiving coded information.

31. An arrangement for impairing detection of an object in an electrically conductive medium to be detected by means of an apparatus comprising:
(a) means for supplying an electric field in said electrically conductive medium, said means comprising at least two pairs of current feeding electrodes located in such positions, that the electric fields generated have different orientation;
(b) a plurality of detection devices, said devices connected in pairs and placed in an area of said electrically conductive medium to be surveyed;
(c) an electronic assembly for providing an indication of a state of detection of the anomaly, the input of said assembly connected to said pairs of detection devices, said electronic assembly comprising an amplifier, a filter tuned at least to one of the frequencies used in the feeding current, and a display unit, said electronic assembly comprising:
  (i) means for measuring an electric field parameter between said pair detection devices;
  (ii) means for comparing said electric field parameter to an electric field reference parameter, said electric field reference parameter representing absence of the anomaly; and
  (iii) display system for displaying results of said step of comparing; and
(d) a switching system for connecting said current feeding electrodes to respective current source and for connecting detection devices to respective electronic assemblies, wherein:
said arrangement for impairing detection of said object comprises:
  at least one electrode to be mounted on each of at least two sides of the object;
  a measuring device for measuring said electric field parameter between at least two of said electrodes; and
  means for connecting a load between at least between two of said electrodes, whereas the impedance of said load is adjusted to a value, which makes the object look as the conductive medium round the object.

32. An apparatus according to claim 31, wherein said medium comprises sea water, said apparatus further comprising:
means on the vessel for periodically changing conductivity of the vessel, by means controlling the conductivity of the load with coded information, said conductivity changes being detected by said detection devices in other places within the area to be surveyed.

33. An arrangement for impairing detection of an object to be detected by means of an apparatus comprising:
(a) means for supplying an electric field in said electrically conductive medium, said means comprising at least two pairs of current feeding electrodes located in such positions, that the electric fields generated have different orientations;
(b) a plurality of detection devices, said devices connected in pairs and placed in an area of said electrically conductive medium to be surveyed;
(c) an electronic assembly for providing an indication of a state of detection of the anomaly, the input of said assembly connected to said pairs of detection devices, said electronic assembly comprising an amplifier, a filter tuned at least to one of the frequencies used in the feeding current, and display unit, said electronic assembly comprising:
  (i) means for measuring an electric field parameter between said pairs detection devices;
  (ii) means for comparing said electric field parameter to an electric field reference parameter, said electric field reference parameter representing absence of the anomaly; and
  (iii) display system for displaying results of said step of comparing; and
(d) a switching system for connecting said current feeding electrodes to respective current source and for connecting detection devices to respective electronic assemblies, said arrangement for impairing detection comprising:

a tree-layer covering for at least one surface of the object to be detected, said tree-layer covering comprising:
  (i) an inner-most layer having a good conductive properties;
  (ii) a middle layer having a predetermined dielectric constants that, at highest measuring frequency of said electric field, the middle layer of the object has a conductivity generally equal to that of water; and
  (iii) an outer-most layer having a surface resistance so that, at low frequencies of said electric field, the outer-most layer of the object has a conductivity generally equal to that of water.

* * * * *